(12) United States Patent
Sakamoto et al.

(10) Patent No.: US 7,693,405 B2
(45) Date of Patent: Apr. 6, 2010

(54) IMAGE PICKUP DEVICE, METHOD OF CONTROLLING IMAGE PICKUP DEVICE, AND RECORDING MEDIUM

(75) Inventors: Kazuhiro Sakamoto, Shiojiri (JP); Michihiro Nagaishi, Okaya (JP); Tatsuya Hosoda, Chino (JP)

(73) Assignee: Seiko Epson Corporation (JP)

( * ) Notice: Subject to any disclaimer, the term of this patent is extended or adjusted under 35 U.S.C. 154(b) by 637 days.

(21) Appl. No.: 11/563,242

(22) Filed: Nov. 27, 2006

(65) Prior Publication Data

US 2007/0122129 A1    May 31, 2007

(30) Foreign Application Priority Data

Nov. 25, 2005 (JP) ............................ 2005-339715
Nov. 25, 2005 (JP) ............................ 2005-339716
Dec. 27, 2005 (JP) ............................ 2005-375280
Oct. 17, 2006 (JP) ............................ 2006-282302

(51) Int. Cl.
*G03B 17/00* (2006.01)
*H04N 5/232* (2006.01)
*G03B 13/00* (2006.01)
*G02B 27/64* (2006.01)

(52) U.S. Cl. ..................... 396/55; 396/53; 396/82; 348/208.2; 348/208.11; 348/208.12; 250/201.7; 359/557

(58) Field of Classification Search ............... 396/52, 396/53, 55, 79, 80, 82; 348/208.99, 208.2, 348/208.4, 208.7, 208.11, 208.12, 345, 349, 348/353; 359/554, 557; 250/201.2, 201.7
See application file for complete search history.

(56) References Cited

U.S. PATENT DOCUMENTS 6,115,552 A * 9/2000 Kaneda ....................... 396/82

FOREIGN PATENT DOCUMENTS

JP    2001-66657    3/2001
JP    2003-195156    7/2003

* cited by examiner

*Primary Examiner*—Rochelle-Ann J Blackman
(74) *Attorney, Agent, or Firm*—Harness, Dickey & Pierce, P.L.C.

(57) ABSTRACT

An image pickup device is provided which includes: an auto focus control unit sampling contrast values as a function of a relative distance from an object by detecting a contrast of an image of the object while driving a lens in an optical axis direction, calculating a focused focal position on the basis of the contrast values, and driving the lens to the focused focal position; a shake detecting unit detecting at least an amount of shake in the optical axis direction of the lens; and a selection judging unit judging selection and non-selection of the sampled contrast values depending on the amount of shake in the optical axis direction of the lens at the time of the sampling. Here, the auto focus control unit calculates the focused focal position on the basis of the contrast value judged as being selected by the selection judging unit among the sampled contrast values.

5 Claims, 11 Drawing Sheets

IMAGE PICKUP DEVICE, METHOD OF CONTROLLING IMAGE PICKUP DEVICE, AND RECORDING MEDIUM

BACKGROUND

1. Technical Field

The present invention relates to an image pickup device, a method of controlling the image pickup device, and a recording medium, and more particularly, to an auto focus control technology in an image pickup device which performs an auto focus control operation using a contrast detection method.

2. Related Art

In the past, in image pickup devices such as a digital still camera picking up a still image, an auto focus mechanism which can automatically take the focus by measuring a distance from an object and adjusting a position of a lens was known.

Since the auto focus mechanism automatically takes the focus without a user's manual operation, it is possible to remarkably simplify the manipulation of the image pickup device.

However, since the mechanism for detecting a focused focal point is simple, a contrast detecting method was employed in such an image pickup device (for example, see JP-A-2003-195156).

In the contrast detecting method, the auto focus control is performed on the basis of a principle that the contrast ratio of an image obtained at the focused focal point is the highest.

The contrast detecting method is a detection method of substantially driving a lens to set the position having the highest contrast as the focused focal point. Accordingly, when the distance from an object varies due to shake or the like, correct contrast information cannot be obtained and thus it is not possible to accurately perform the auto focus control.

SUMMARY

An advantage of some aspects of the invention is that it provides an image pickup device which can collect more accurate contrast information and perform an accurate auto focus control even when shake occurs in the image pickup device employing a contrast detecting method, a control method thereof, and a recording medium having a control program stored therein.

According to an aspect of the invention, there is provided an image pickup device comprising: an auto focus control unit sampling contrast values as a function of a relative distance from an object by detecting a contrast of an image of the object while driving a lens in an optical axis direction, calculating a focused focal position on the basis of the contrast values, and driving the lens to the focused focal position; a shake detecting unit detecting at least an amount of shake in the optical axis direction of the lens; and a selection judging unit judging selection and non-selection of the sampled contrast values depending on the amount of shake in the optical axis direction of the lens at the time of the sampling, wherein the auto focus control unit calculates the focused focal position on the basis of the contrast value judged as being selected by the selection judging unit among the sampled contrast values.

According to this configuration, the auto focus control unit samples the contrast values as a function of a relative distance from an object by detecting a contrast of an image of the object while driving a lens in an optical axis direction, calculates a focused focal position on the basis of the contrast values, and drive the lens to the focused focal position.

In addition, the shake detecting unit detects at least an amount of shake in the optical axis direction of the lens; and the selection judging unit judges the selection and non-selection of the sampled contrast values depending on the amount of shake in the optical axis direction of the lens at the time of the sampling.

Accordingly, the auto focus control unit calculates the focused focal position on the basis of the contrast value judged as being selected by the selection judging unit among the sampled contrast values.

Therefore, even when shake occurs, it is possible to obtain an accurate contrast value, thereby performing an accurate auto focus control.

In this case, the selection judging unit may judge that the corresponding sampled contrast value is selected when the amount of shake at the time of the sampling is equal to or less than a first reference amount of shake and may judge that the corresponding sampled contrast value is not selected when the amount of shake is equal to or more than a second reference amount of shake larger than the first reference amount of shake.

According to the configuration, it is possible to calculate the focused focal position using only the more accurate contrast values less affected by the shake.

When the amount of shake at the time of n-th sampling (where n is an integer equal to or greater than 2) is greater than a first reference amount of shake and less than a second reference amount of shake, the selection judging unit may select a contrast value of the closest lens position among a lens position at the time of (n−1)-th sampling, a lens position at the time of n-th sampling, and a lens position at the time of (n+1)-th sampling without any shake as a lens position at the time of n-th sampling after correcting the amount of shake.

According to the configuration, the acquired contrast value can be correlated with the lens position having the smallest error, thereby calculating the focused focal position with higher accuracy.

According to another aspect of the invention, there is provided an image pickup device comprising: an auto focus control unit sampling contrast values as a function of a relative distance from an object by detecting a contrast of an image of the object while driving a lens in an optical axis direction, calculating a focused focal position on the basis of the contrast values, and driving the lens to the focused focal position; a shake detecting unit detecting at least an amount of shake in the optical axis direction of the lens; and a distance correcting unit correcting the relative distance corresponding to the corresponding sampled contrast value on the basis of the amount of shake in the optical axis direction of the lens at the time of the sampling, wherein the auto focus control unit calculates the focused focal position on the basis of the contrast value after correcting the relative distance.

According to the configuration, the shake detecting unit detecting at least an amount of shake in the optical axis direction of the lens and the distance correcting unit correcting the relative distance corresponding to the corresponding sampled contrast value on the basis of the amount of shake in the optical axis direction of the lens at the time of the sampling.

Accordingly, the auto focus control unit samples contrast values as a function of a relative distance from an object by detecting a contrast of an image of the object while driving a lens in an optical axis direction, calculates a focused focal position on the basis of the contrast values, and drives the lens to the focused focal position.

Therefore, even when shake occurs, the acquired contrast value can be correlated with the more accurate relative distance between the lens and the object, thereby performing the auto focus control with higher accuracy.

In this case, the distance correcting unit may correct the relative distance when the amount of shake at the time of the sampling is greater than a predetermined reference amount of shake.

According to the configuration, a necessary correction of the relative distance can be performed without consuming unnecessary processing time, thereby performing the auto focus control with high accuracy.

The auto focus control unit may complement the contrast value after correcting the relative distance to create a contrast curve and may calculate the focused focal position on the basis of the created contrast curve.

According to the configuration, the created contrast curve can approach an ideal curve without any shake, thereby performing the auto focus control with higher accuracy.

The shake detecting unit may include gyro sensors and detect the amount of shake on the basis of an angular velocity detection signal output from the corresponding gyro sensor.

According to the configuration, it is possible to satisfactorily detect the amount of shake and to implement the auto focus control with accuracy.

The auto focus control unit may include an auto focus correcting unit performing a correction control so as to correct the focused focal position on the basis of the amount of shake in the optical axis direction of the lens and to drive the lens to the corrected focused focal position.

According to the configuration, the focused focal position can be corrected in consideration of the shake in the optical axis direction of the lens and the focused focal position less affected by the shake can be obtained, thereby performing the auto focus control with higher accuracy.

The auto focus control unit may deviate a relative position of the lens to an image pickup element by the amount of shake by means of the correction control.

According to the configuration, by deviating a relative position of the lens to an image pickup element by the amount of shake, the shake can be canceled and the state having no shake can be approached, thereby performing the auto focus control with higher accuracy.

The image pickup device may further comprise a shutter switch operating a shutter. Here, the auto focus control unit may drive the lens to the focused focal position and holds the lens at the corresponding position at the time of semi-shuttering the shutter switch, and the auto focus correcting unit may perform the correction control at the time of full-shuttering the shutter switch.

According to the configuration, since the amount of drive of the lens in the correction control is smaller than the amount of drive of the lens to the focused focal position, it is possible to satisfactorily drive the lens to a desired lens position. In addition, it is possible to perform the auto focus control with higher accuracy.

According to another aspect of the invention, there is provided a method of controlling an image pickup device having an auto focus mechanism sampling contrast values as a function of a relative distance from an object by detecting a contrast of an image of the object while driving a lens in an optical axis direction, calculating a focused focal position on the basis of the contrast values, and driving the lens to the focused focal position, the method comprising: detecting at least an amount of shake in the optical axis direction of the lens; judging selection and non-selection of the sampled contrast values depending on the amount of shake in the optical axis direction of the lens at the time of the sampling; and calculating the focused focal position on the basis of the contrast value judged as being selected in the judging among the sampled contrast values.

Therefore, even when shake occurs, it is possible to obtain an accurate contrast value, thereby performing an accurate auto focus control.

The calculating the focused focal position may include correcting the focused focal position on the basis of the amount of shake in the optical axis direction of the lens and allowing the auto focus mechanism to drive the lens to the corrected focused focal position as a new focused focal position.

According to the configuration, the focused focal position can be corrected in consideration of the shake in the optical axis direction of the lens and the focused focal position less affected by the shake can be obtained, thereby performing the auto focus control with higher accuracy.

According to another aspect of the invention, there is provided a method of controlling an image pickup device having an auto focus mechanism sampling contrast values as a function of a relative distance from an object by detecting a contrast of an image of the object while driving a lens in an optical axis direction, calculating a focused focal position on the basis of the contrast values, and driving the lens to the focused focal position, the method comprising: detecting at least an amount of shake in the optical axis direction of the lens; correcting the relative distance corresponding to the corresponding sampled contrast value on the basis of the amount of shake in the optical axis direction of the lens at the time of the sampling; and calculating the focused focal position on the basis of the contrast value after correcting the relative distance.

Therefore, even when shake occurs, the acquired contrast value can be correlated with the more accurate relative distance between the lens and the object, thereby performing the auto focus control with higher accuracy.

The calculating the focused focal position may include correcting the focused focal position on the basis of the amount of shake in the optical axis direction of the lens and allowing the auto focus mechanism to drive the lens to the corrected focused focal position as a new focused focal position.

According to the configuration, the focused focal position can be corrected in consideration of the shake in the optical axis direction of the lens and the focused focal position less affected by the shake can be obtained, thereby performing the auto focus control with higher accuracy.

According to another aspect of the invention, there is provided a computer-readable recording medium recording a control program making a computer control an image pickup device having an auto focus mechanism sampling contrast values as a function of a relative distance from an object by detecting a contrast of an image of the object while driving a lens in an optical axis direction, calculating a focused focal position on the basis of the contrast values, and driving the lens to the focused focal position, the control program comprising: detecting at least an amount of shake in the optical axis direction of the lens; judging selection and non-selection of the sampled contrast values depending on the amount of shake in the optical axis direction of the lens at the time of the sampling; and calculating the focused focal position on the basis of the contrast value judged as being selected by the selection judging unit among the sampled contrast values.

Therefore, even when shake occurs, it is possible to obtain an accurate contrast value by allowing the computer to control the image pickup device with the control program, thereby performing an accurate auto focus control.

The control program may further comprise correcting the focused focal position on the basis of the amount of shake in the optical axis direction of the lens and allowing the auto focus mechanism to drive the lens to the corrected focused focal position as a new focused focal position.

According to the configuration, by allowing the computer to control the image pickup device with the control program, the focused focal position can be corrected in consideration of the shake in the optical axis direction of the lens and the focused focal position less affected by the shake can be obtained, thereby performing the auto focus control with higher accuracy.

According to another aspect of the invention, there is provided a computer-readable recording medium recording a control program making a computer control an image pickup device having an auto focus mechanism sampling contrast values as a function of a relative distance from an object by detecting a contrast of an image of the object while driving a lens in an optical axis direction, calculating a focused focal position on the basis of the contrast values, and driving the lens to the focused focal position, the control program comprising: detecting at least an amount of shake in the optical axis direction of the lens; correcting the relative distance corresponding to the corresponding sampled contrast value on the basis of the amount of shake in the optical axis direction of the lens at the time of the sampling; and calculating the focused focal position on the basis of the contrast value after correcting the relative distance.

Therefore, even when shake occurs, the acquired contrast value can be correlated with the more accurate relative distance between the lens and the object by allowing the computer to control the image pickup device with the control program, thereby performing the auto focus control with higher accuracy.

The control program may further comprise correcting the focused focal position on the basis of the amount of shake in the optical axis direction of the lens and allowing the auto focus mechanism to drive the lens to the corrected focused focal position as a new focused focal position.

BRIEF DESCRIPTION OF THE DRAWINGS

The invention will be described with reference to the accompanying drawings, wherein like numbers reference like elements.

DESCRIPTION OF EXEMPLARY EMBODIMENTS

Next, exemplary embodiments of the invention will be described with reference to the drawings.

In the exemplary embodiments, the invention is applied to a portable digital still camera (hereinafter, simply referred to as "digital still camera") as an aspect of an electronic apparatus.

First Embodiment

Figure 1:
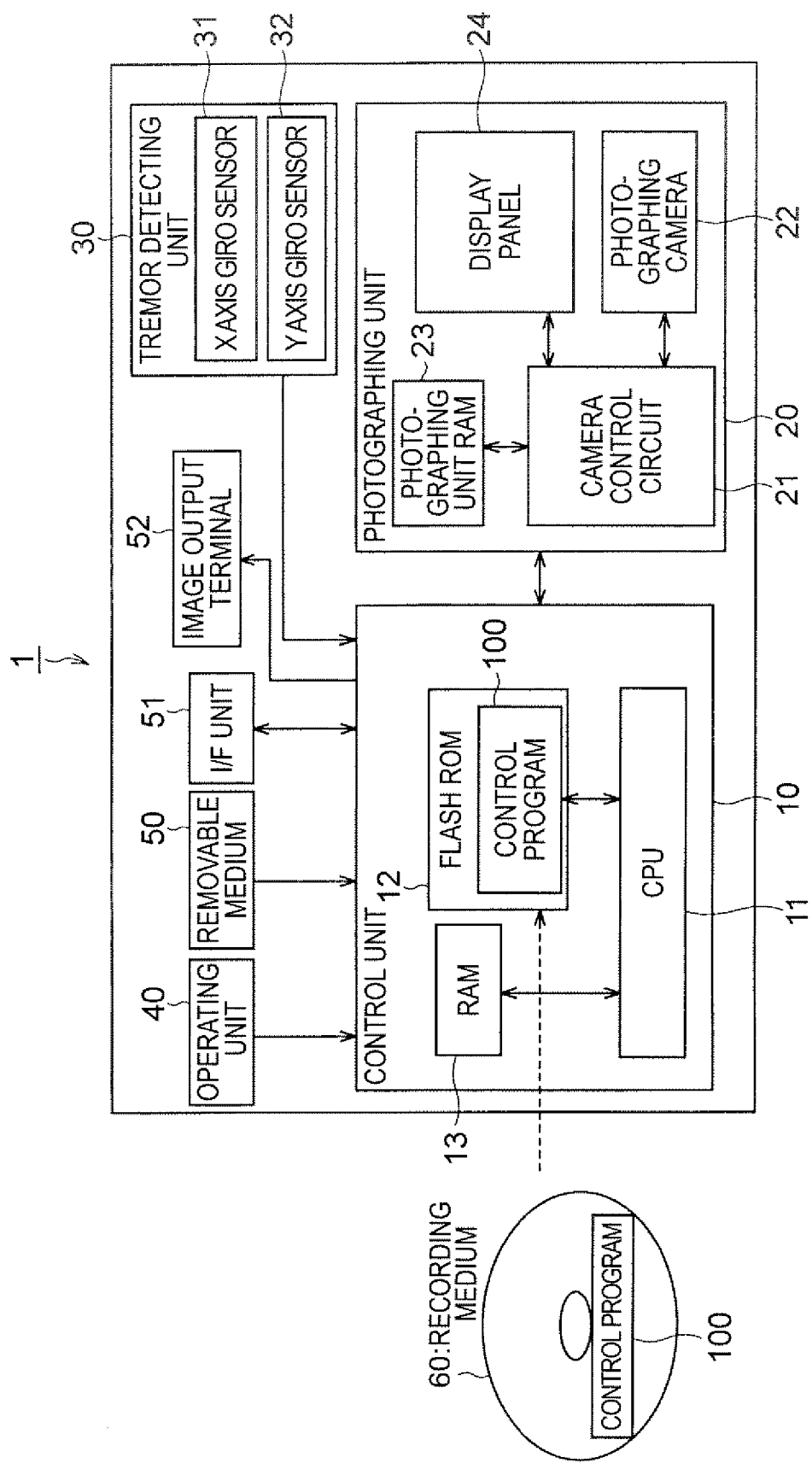
FIG. 1 is a block diagram illustrating a schematic configuration of a digital still camera according to an embodiment of the invention.

FIG. 1 is a block diagram illustrating a schematic configuration of a digital still camera according to a first embodiment of the invention.

As shown in FIG. 1, the digital still camera 1 includes a control unit 10, a photographing unit 20, an angular velocity detecting unit 30, an operating unit 40, a removable medium 50, an I/F unit 51, and an image output terminal 52.

The control unit 10 serves as a control unit for controlling the respective elements of the digital still camera 1 and includes a CPU 11 executing a variety of programs or performing an operating process, a rewritable flash ROM (hereinafter, simply referred to as "ROM") 12 storing a control program 100 executed by the CPU 11 or a variety of data, a RAM 13 serving as a work area temporarily storing the operation results of the CPU 11 or a variety of data, and a timer circuit 14 counting time in a self timer photographing operation or the like. The control program 100 stored in the ROM 12 includes a moving picture display program for performing an auto focus correcting operation.

The control program 100 can be recorded in a variety of computer-readable recording mediums 60 including a ROM (rewritable semiconductor memory such as EEPROM), a semiconductor memory card, an optical disc recording medium such as a CD-ROM and a DVD-ROM, and a magnetic recording medium such as a flexible disc and a hard disc and can be distributed. By communicatably connecting the digital still camera 1 to a personal computer through a cable, etc or through a communication network and outputting the control program 100 of the recording medium 60 read out by the personal computer to the digital still camera 1, the control program 100 may be stored in the flash ROM 12.

The photographing unit 20 serves to photograph an object as a still image and includes a camera control circuit 21, a photographing camera 22, a photographing unit RAM 23, and a display panel 24.

The camera control circuit 21 controls the respective elements of the photographing unit 20 under the control of the control unit 10. The photographing camera 22 picks up an image with a CCD sensor or a CMOS image sensor. The photographing camera 22 outputs corresponding image data to the camera control circuit 21. In the CCD or CMOS image sensor, photoelectric conversion elements are arranged in a two-dimensional matrix shape or in a honeycomb shape.

The photographing camera 22 roughly includes an optical lens system, a lens driving device, an iris driving device, and an A/D conversion circuit. Here, the optical lens system includes a plurality of optical lenses. The lens driving device drives the optical lens system to perform a zoom operation, a focusing operation, etc. The iris driving device controls an iris for automatic exposure. The A/D conversion circuit converts analog signals acquired from the CCD or CMOS image sensor into digital signals and outputs the digital signals as image data.

The photographing unit RAM 23 temporarily stores the image data.

The display panel 24 displays a variety of information such as a photographed still image or a setting picture. The display panel 24 is formed of a flat display panel such as a liquid crystal display panel and an organic EL panel.

The removable medium 50 stores the moving image data at the time of photographing. The removable medium 50 is formed of a video tape, a writable optical disc, a removable hard disc, or the like.

In this configuration, the image data of a frame output from the photographing camera 22 are subjected to a predetermined image process by the camera control circuit 21. Thereafter, the image data are temporarily stored in the photographing unit RAM 23. The image data is sequentially written as the moving image data in the removable medium 50 through the control unit 10. The image data stored in the still image on the display panel 24 in a live viewing manner The image data of a still image stored in the removable medium 50 are used for displaying the still image after the photographing operation.

Figure 2:
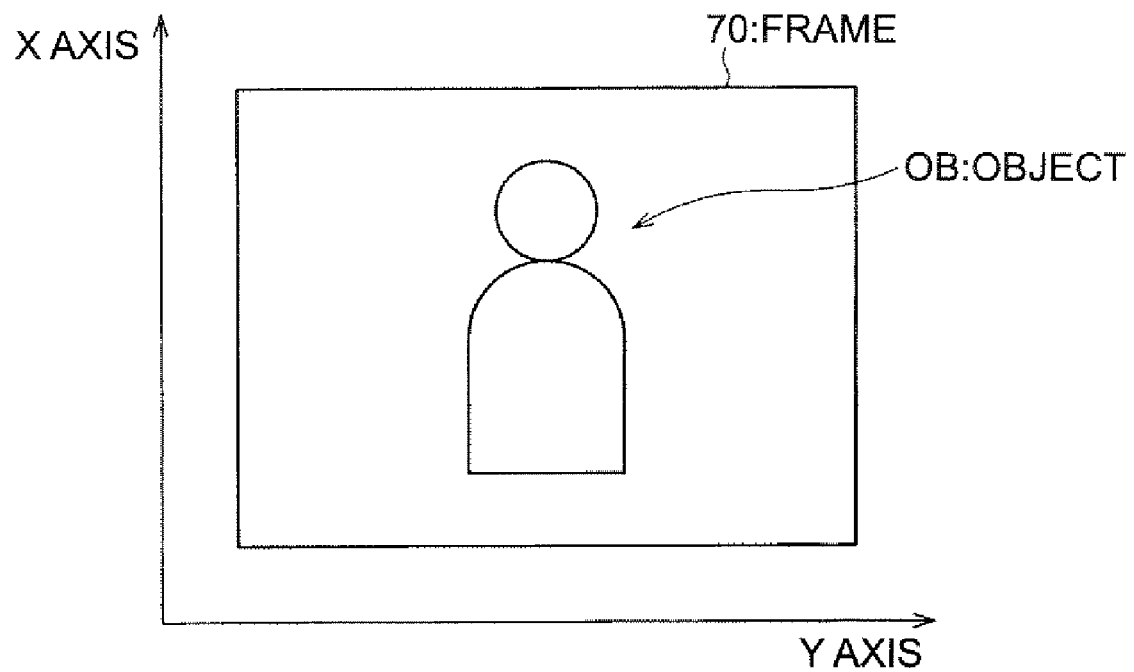
FIG. 2 is an explanatory diagram illustrating an axis of an angular velocity.

FIG. 2 is an explanatory diagram illustrating the axes of an angular velocity.

The angular velocity detecting unit 30 serves as a shake detecting unit for detecting the amount of shake. Specifically, as shown in FIG. 2, the angular velocity detecting unit 30 individually detects the angular velocity of movement in the vertical direction (hereinafter, defined as an X axis) of the frame 70 and the angular velocity of movement in the horizontal direction (hereinafter, defined as an Y axis) That is, as shown in FIG. 1, the angular velocity detecting unit 30 includes two gyro sensors 31 and 32 of an X axis gyro sensor 31 and a Y axis gyro sensor 32. The gyro sensors 31 and 32 output angular velocity detection signals corresponding to the angular velocities to the control unit 10.

The control unit 10 receives the angular velocity detection signals of the gyro sensors 31 and 32 in synchronization with a sampling period of the frame 70. Accordingly, the control unit 10 calculates the amounts of shake for the X axis and the Y axis on the basis of the angular velocities corresponding to the angular velocity detection signals. The control unit 10 correlates the calculated amount of shake with the image data of the frame 70 or adds the calculated amount of shake to the image data and then stored the image data in the removable medium 50.

In this embodiments, the control unit 10 calculates an integrated angular velocity for a predetermined sampling period and amounts of shake θ (an amount of shake θx in the X axis direction and an amount of shake θy in the Y axis direction) for the predetermined sampling period by the use of the gyro sensors 31 and 32. However, voltage values of the angular velocity detection signals when the angular velocity (rad/sec) is zero are different from each other due to individual differences of the gyro sensors 31 and 32 or the like. Accordingly, in this embodiment, the control unit 10 samples the angular velocity detection signals of the gyro sensors 31 and 32 before the photographing operation is started after the power source is turned on and sets the average value thereof as a zero-point voltage value. At this time, the control unit 10 calculates a plurality of zero-point voltage values for a predetermined period of time and sets the average value of the zero-point voltage values as an actual zero-point voltage value when the zero-point voltage values of which differences from the average value of the zero-point voltage values are smaller than a predetermined value occupy a predetermined ratio (for example, 99%) or more. Accordingly, the zero-point voltage value when the body is stationary can be set.

The operating unit 40 has a plurality of operating elements operated by a user and includes a power button or operating keys for inputting a variety of instructions such as start and end of photographing.

The I/F unit 51 is an interface for communicatably connecting the digital still camera 1 to the personal computer through a cable or the like. When the image data stored in the removable medium 50 are output to the personal computer, the image data are output to the personal computer through the I/F unit 51.

The image output terminal 52 is a terminal for outputting image signals corresponding to the image data to an external display device such as a television or a projector. The digital still camera 1 includes an audio circuit for receiving sound signals and recording and reproducing the sound signals and a sound output terminal for outputting the sound signals to an external speaker or an external amplifier.

Operations will be described now.

Figure 3:
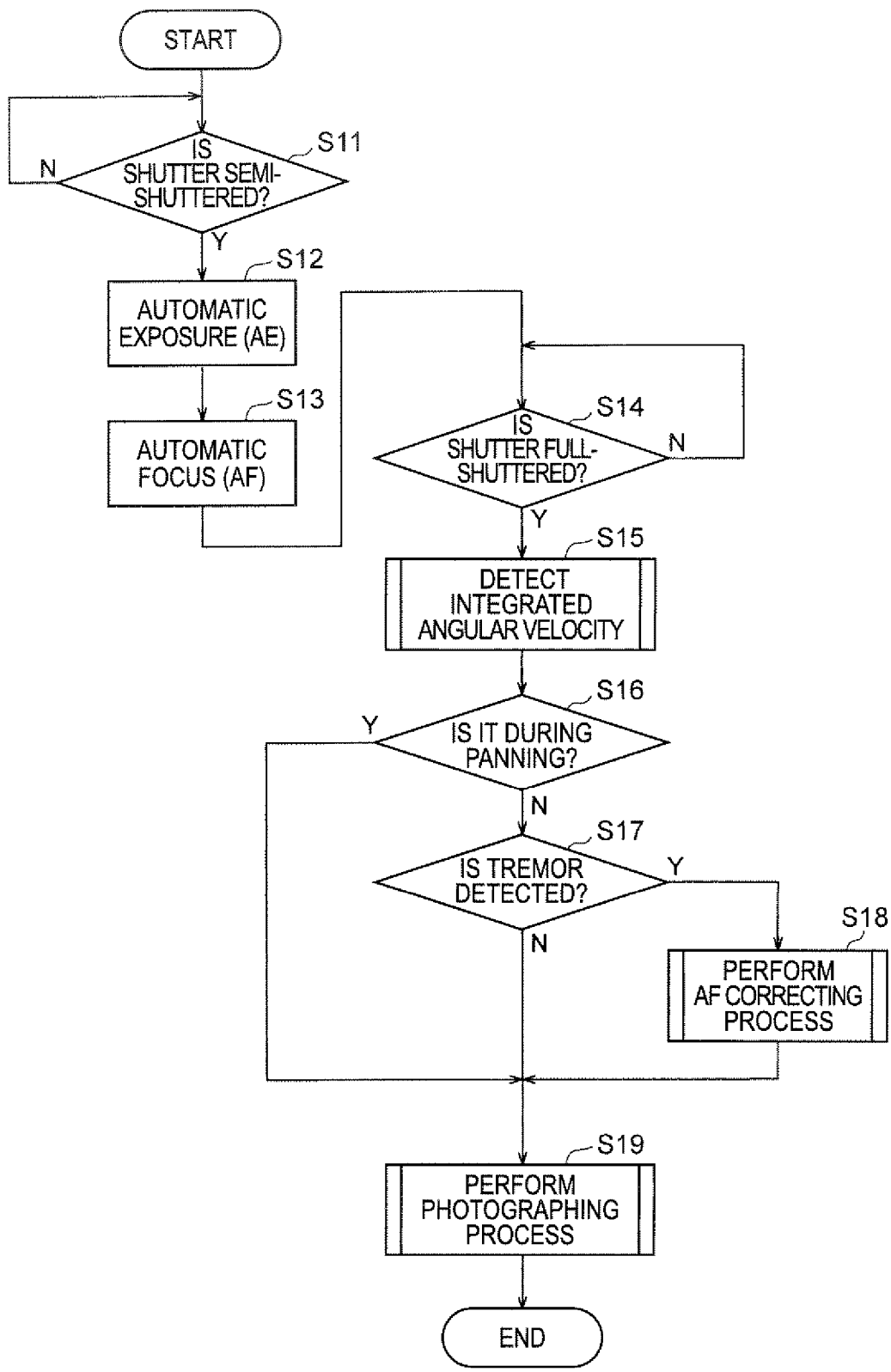
FIG. 3 is a flowchart illustrating the embodiment.

FIG. 3 is a flowchart illustrating this embodiment.

The CPU 11 of the control unit 10 judges whether a shutter switch not shown in the operating unit 40 is semi-shuttered (step S11).

When it is judged in step S11 that the shutter switch is not semi-shuttered (step S11: NO), the CPU 11 is in a standby state.

When it is judged in step S11 that the shutter switch is semi-shuttered (step S11: YES), the CPU 11 controls the camera control circuit 21 to perform an auto exposure controlling operation (step S12).

The CPU 11 controls the camera control circuit 21 to perform an auto focus controlling operation (step S13).

The auto focus controlling operation will be described in detail now.

First, a schematic concept is described.

Figure 4:
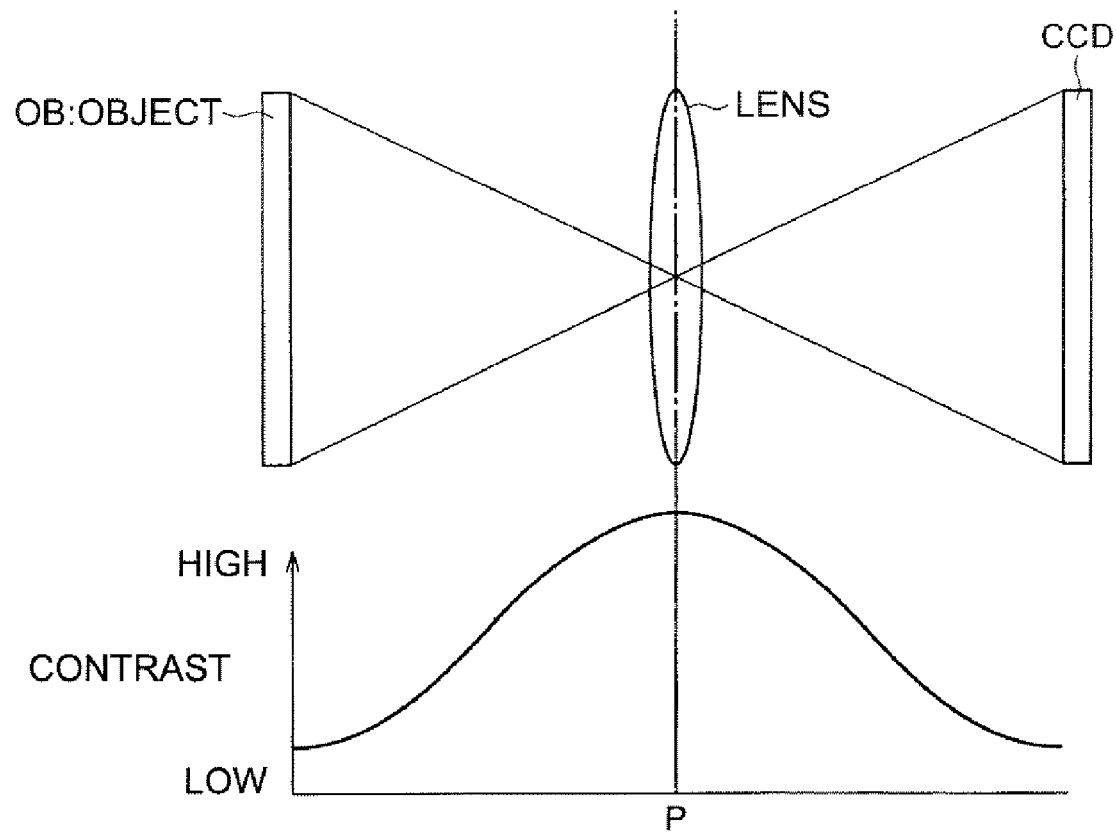
FIG. 4 is an explanatory diagram illustrating a case where an auto focus control is performed using a contrast detecting method.

FIG. 4 is a schematic explanatory diagram illustrating a case where the auto focus controlling operation is performed using a contrast detecting method.

In the contrast detecting method, a lens is driven in practice and a position having the highest contrast is set as the focused focal point. That is, since the lens position P in FIG. 4 is the focused focal point, the lens is fixed to the position P in an auto focus locked state.

Figure 5:
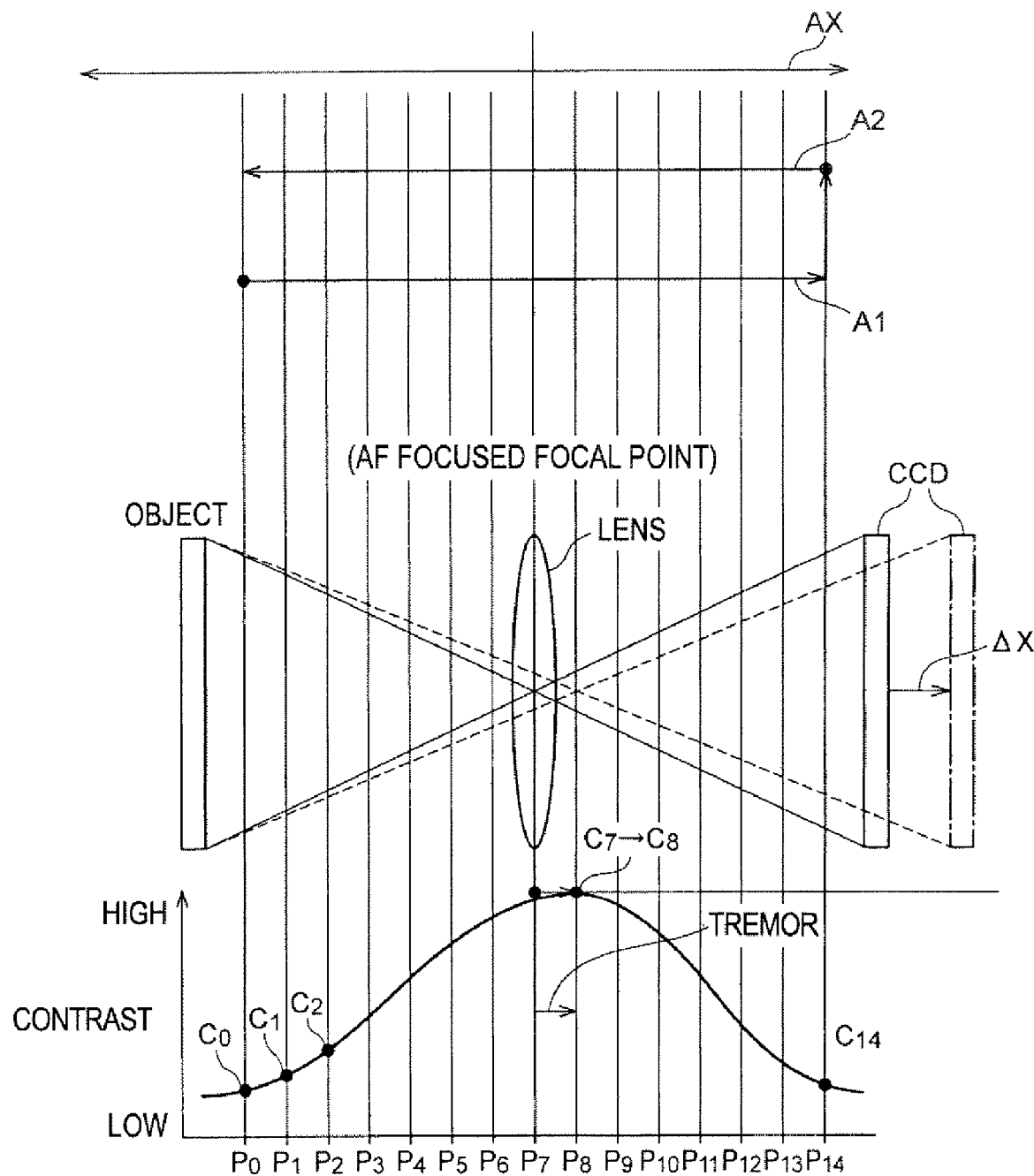
FIG. 5 is a detailed explanatory diagram illustrating a case where an auto focus control is performed using a contrast detecting method.

FIG. 5 is a detailed explanatory diagram illustrating the case where the auto focus controlling operation is performed using the contrast detecting method.

Figure 6:
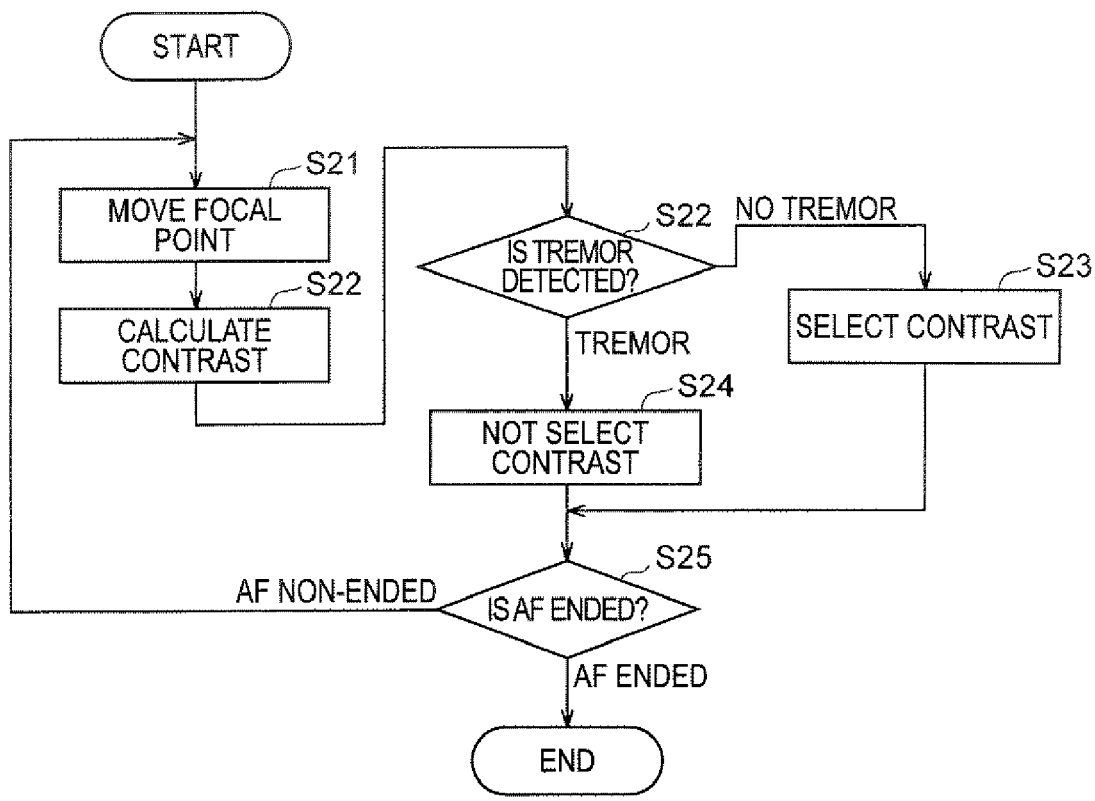
FIG. 6 is an explanatory diagram illustrating a case where an auto focus control according to a first embodiment is performed using a contrast detecting method.

FIG. 6 is a flowchart illustrating a process when the auto focus controlling operation is performed using the contrast detecting method in the first embodiment.

In the following description, it is assumed that the focused focal position without any shake is the lens position P7 and operations without any shake will be first described.

First, when a focal position is detected by means of the auto focus controlling operations, the CPU 11 controls the camera control circuit 21 to set the position of the lens constituting the photographing camera 22 to P0 (=initial focal position) (step S21)

At the position P0, the CPU 11 acquires contrast sampling data C0 by sampling the contrast values (step S22).

Subsequently, the CPU 11 judges whether shake occurs on the basis of the output of the angular velocity detecting unit 30 (step S22).

Figure 7:
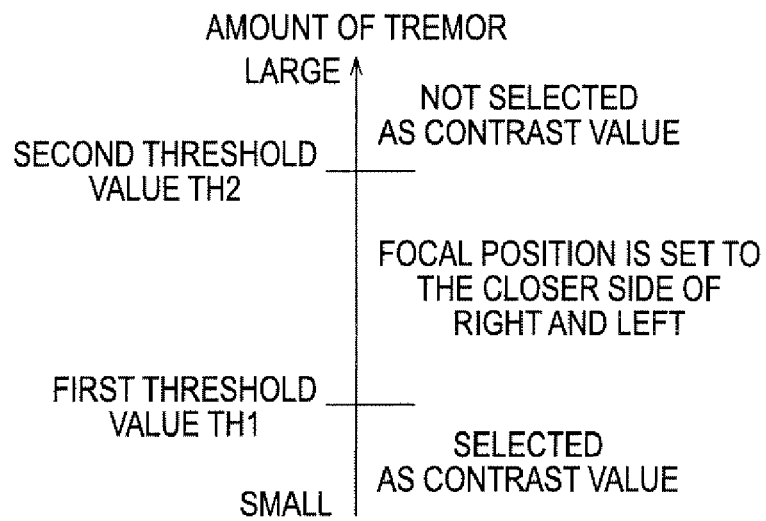
FIG. 7 is an explanatory diagram illustrating a criterion for selecting contrast values based on an amount of shake.

FIG. 7 is an explanatory diagram illustrating a criterion for selecting a contrast value on the basis of the amount of shake in the first embodiment.

In the first embodiment, when the amount of shake is judged, two kinds of threshold values of a first threshold value TH1 and a second threshold value TH2 (TH1<TH2) are provided as the threshold value of the amount of shake.

In an actual selection criterion, when the amount of shake ΔX is less than the second threshold value TH2, the CPU 11 selects the amount of shake.

When the amount of shake ΔX is greater than the first threshold value TH1 and less than the second threshold value TH2, the CPU 11 calculates the lens position Pc after correcting the shake with respect to the original lens position Px (where x is in the range of 0 to 14):

$$Pc = Px - \Delta X.$$

The CPU 11 judges which of lens positions P(x−1), Px, and P(x+1) is closer to the lens position Pc after correcting the shake and selects the closest lens position as a lens position.

Specifically, when |Pc−P(x−1)|<|Pc−Px|<|Pc−P(x+1)|, the CPU 11 sets the lens position to P(x−1) and selects the contrast value at the position.

In this case, since it is considered that no shake exists (amount of shake<TH1), the CPU 11 selects the acquired contrast sampling data C0 in step S23.

Subsequently, the CPU 11 judges whether the auto focus controlling operation is ended (step S25).

In this case, since the auto focus controlling operation is not ended yet, the CPU 11 controls the camera control circuit 21 to drive the lens constituting the photographing camera 22 in the direction of arrow A1 along the optical axis direction AX, sets the position of the lens to P1, and acquires the contrast sampling data C1.

In this way, the CPU 11 performs the processes of steps S21 to S23 and S25 and sequentially acquires the contrast sampling data C2 to C14.

Furthermore, the CPU 11 controls the camera control circuit 21 to perform the processes of steps S21 to S23 and S25 to drive the lens constituting the photographing camera 22 in the direction of arrow A2 along the optical axis direction AX. Then, the CPU 11 acquires the contrast sampling data C14 again with the position of the lens set to P14. Subsequently, the CPU 11 calculates a weighted average of the contrast sampling data C14 acquired at the time of driving the lens in the direction of arrow A1 and the contrast sampling data C14 acquired at the time of driving the lens in the direction of arrow A2 and sets the weighted average as new contrast sampling data C14 at the lens position P14. Hereinafter, the CPU 11 acquires the contrast sampling data C13 to C0 and sets the lens position P7 having the highest contrast as the focused focal position among the acquired contrast sampling data C0 to C14.

Next, operations when shake occurs at the lens position P7 will be described.

First, the CPU 11 controls the camera control circuit 21 to set the position of the lens constituting the photographing camera 22 as P0 (=initial focal position) (step S21).

At the position P0, the CPU 11 samples a contrast value and acquires contrast sampling data C0 (step S22).

Subsequently, the CPU 11 judges whether shake occurs on the basis of the output of the angular velocity detecting unit 30 (step S22).

In this case, since it is assumed that no shake occurs, the CPU selects the acquired contrast sampling data C0 in step S23.

The CPU 11 judges whether the auto focus controlling operation is ended (step S25).

In this case, since the auto focus controlling operation is not ended yet, the CPU 11 controls the camera control circuit 21 to drive the lens constituting the photographing camera 22 in the direction of arrow A1 along the optical axis direction AX. The CPU 11 sets the position of the lens to P1 and acquires the contrast sampling data C1.

In this way, the CPU 11 performs the processes of steps S21 to S23 and S25 and sequentially acquires the contrast sampling data C2 to C6.

Subsequently, the CPU 11 controls the camera control circuit 21 to set the position of the lens constituting the photographing camera 22 to P7 (step S21).

At the position P7, the CPU 11 samples a contrast value and acquires contrast sampling data C7 (step S22).

Then, the CPU 11 judges whether shake occurs at the time of acquiring the contrast sampling data C7, on the basis of the output of the angular velocity detecting unit 30 (step S22).

In this case, when the obtainable amount of shake ΔX is equal to or greater than the second threshold value TH2, the CPU 11 performs the process of step S25 without selecting the contrast sampling data C7 (step S24).

When the obtainable amount of shake ΔX is less than the second threshold value TH2, the CPU 11 selects the contrast sampling data C7. However, when the amount of shake ΔX is greater than the first threshold value TH1 and less than the second threshold value TH2, the CPU 11 calculates the lens position Pc after correcting the shake with respect to the original lens position P7:

$$Pc = P7 - \Delta X.$$

The CPU 11 judges which of lens positions P6, P7, and P8 is closer to the lens position Pc after correcting the shake and selects the closest lens position as a lens position.

Specifically, when |Pc−P6|<|Pc−P7|<|Pc−P8|, the CPU 11 sets the lens position to P8 and selects the contrast value C8 at the position P8.

Furthermore, the CPU 11 controls the camera control circuit 21 to perform the processes of steps S21 to S23 and S25 to drive the lens constituting the photographing camera 22 in the direction of arrow A2 along the optical axis direction AX. Then, the CPU 11 acquires the contrast sampling data C14 again with the position of the lens set to P14. Subsequently, the CPU 11 calculates a weighted average of the contrast sampling data C14 acquired at the time of driving the lens in the direction of arrow A1 and the contrast sampling data C14 acquired at the time of driving the lens in the direction of arrow A2 and sets the weighted average as new contrast sampling data C14 at the lens position P14.

Next, the CPU 11 acquires the contrast sampling data C13 to C0 and sets the lens position PS having the highest contrast as the focused focal position among the acquired contrast sampling data C0 to C14.

Subsequently, the CPU 11 judges whether the shutter switch is full-shuttered (step S14).

When it is judged in step S14 that the shutter switch is not full-shuttered yet (step S14: NO), the CPU 11 is in the standby state.

When it is judged in step S14 that the shutter switch is full-shuttered (step S14: YES), the CPU 11 the integrated angular velocity for the predetermined sampling period on the basis of the output signals of the angular velocity detecting unit 30 (step S15).

The calculation of the integrated angular velocity in the control unit 10 will be described in brief. The CPU 11 of the control unit 10 calculates the angular velocity (rad/sec) on the basis of the angular velocity detection signal and calculates the integrated angular velocity Σ(rad/sec) by integrating the angular velocity (rad/sec) with a predetermined sampling interval (sec). In practice, the CPU 11 calculates the X-axis integrated angular velocity Σx and the Y-axis integrated angular velocity Σy as the integrated angular velocity.

Subsequently, the CPU 11 judges whether a panning operation of the digital still camera is performed on the basis of the X-axis integrated angular velocity Σx and the Y-axis integrated angular velocity Σy (step S16). Here, the panning operation means an operation of semi-shuttering the shutter switch in a state where a person is disposed at the center of a screen, performing the auto focus lock to the person, and then changing the orientation of the digital still camera and correcting the composition so that a person is disposed at side portion of the screen.

When it is judged in step S16 that the panning operation is performed in the digital still camera (step S16: YES), the CPU 11 needs hold the auto focus locked state without considering the shake. Accordingly, the CPU performs the photographing operation at once (step S19). That is, the CPU 11 fixes the lens to the focused focal position where the auto focus locked state is set by the auto focus controlling operation of step S13 and then taking a photograph of an object with the photographing camera 22. The CPU 11 temporarily stores the acquired image data in the photographing unit RAM 23 and writes the image data to the removable medium 50 under the control of the control unit 10.

At the same time of writing the image data in the removable medium 50, the taken image is displayed on the display panel 24.

When it is judged in step S16 that the digital still camera does not perform the panning operation (step S16: NO) the CPU 11 of the control unit 10 calculates an X-axis amount of shake θx (mm) and an Y-axis amount of shake θy (mm) on the basis of the calculated X-axis integrated angular velocity Σx and Y-axis integrated angular velocity Σy. Subsequently, the CPU 11 judges whether at least one of the X-axis amount of shake θx and the Y-axis amount of shake θy is greater than an allowable value (step S17). In this case, the allowable value is properly set on the basis of the photographing condition such as a zoom magnification and a shutter speed.

When it is judged in step S17 that at least one of the X-axis amount of shake θx and the Y-axis amount of shake θy is greater than the allowable value (step S17: YES), the CPU 11 performs an auto focus correcting operation (step S18). Here, necessity for the auto focus correcting process will be described.

In the past image pickup device, an auto focus lock mechanism activating an auto focus mechanism by semi-shuttering the shutter switch and fixing the focused focal position in the state was generally employed.

The focused focal position is fixed. Accordingly, in the image pickup device, when the position of the image pickup device body departs from the focused focal position due to shake right after the auto focus lock, a defocused image, that is, a so-called out-of-focus image, is obtained.

In order to prevent the defocused image, the auto focus function is released to perform only a photographing process using a manual focusing function when shake occurs, in the camera disclosed in JP-A-2001-66657. However, there is a problem that the photographing process using the auto focusing function cannot be performed.

Therefore, even when shake occurs, the image pickup is performed using the auto focusing function and the auto focus correcting operation is performed so that the time for the auto focusing operation is not too long. The auto focus correcting operation can be applied to another auto focus controlling operation, in addition to the auto focus controlling operation according to this embodiment. Specifically, an active detection method of detecting a distance from the time or irradiation angle for irradiating infrared rays or ultrasonic waves to an object and receiving the reflected waves in the same principle as radar, or a passive detection method such as a phase difference detecting method can be used.

Figure 8:
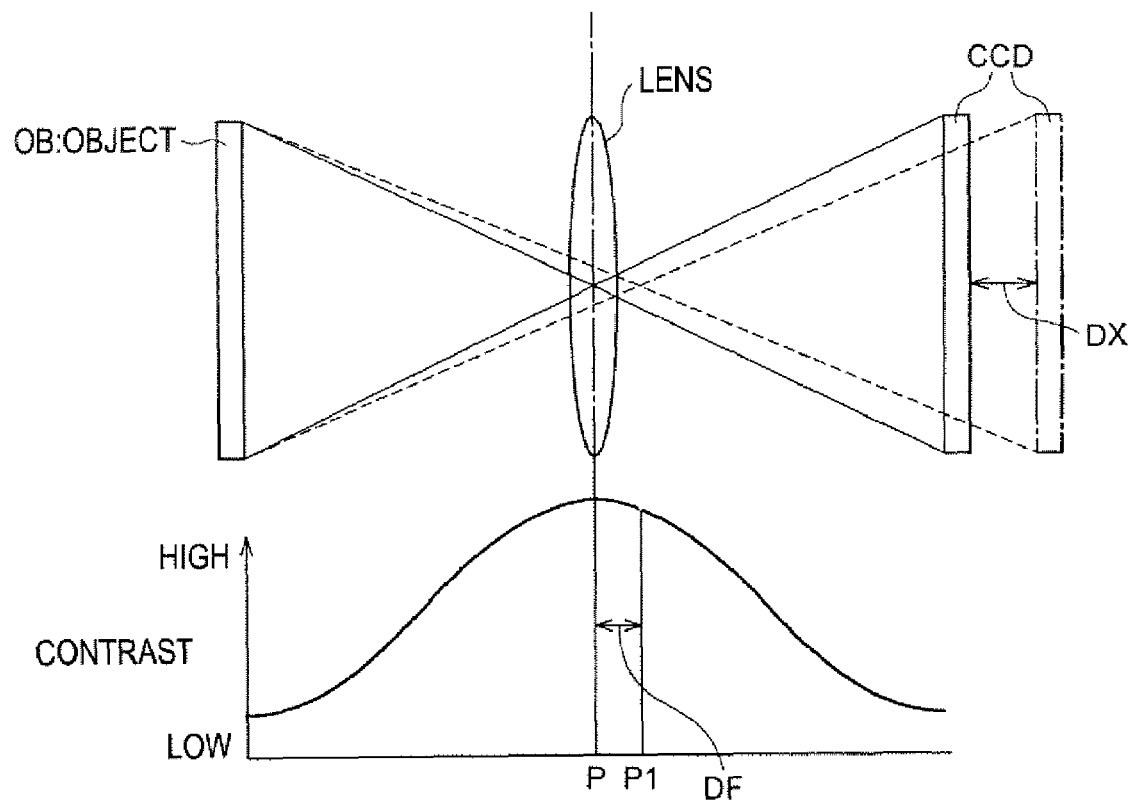
FIG. 8 is a diagram illustrating a principle of the auto focus correcting process.

FIG. 8 is a diagram illustrating a principle of the auto focus correcting operation.

As shown in FIG. 8, a difference DF between the focused focal position P when no shake occurs and the focused focal position P1 when shake occurs is correlated with an amount of movement DX due to the shake of the CCD of the digital still camera 1.

Accordingly, when the amount of movement DX due to the shake of the digital still camera 1 can be detected, the focused focal position can be corrected to the position P1 from the position P.

Figure 9:
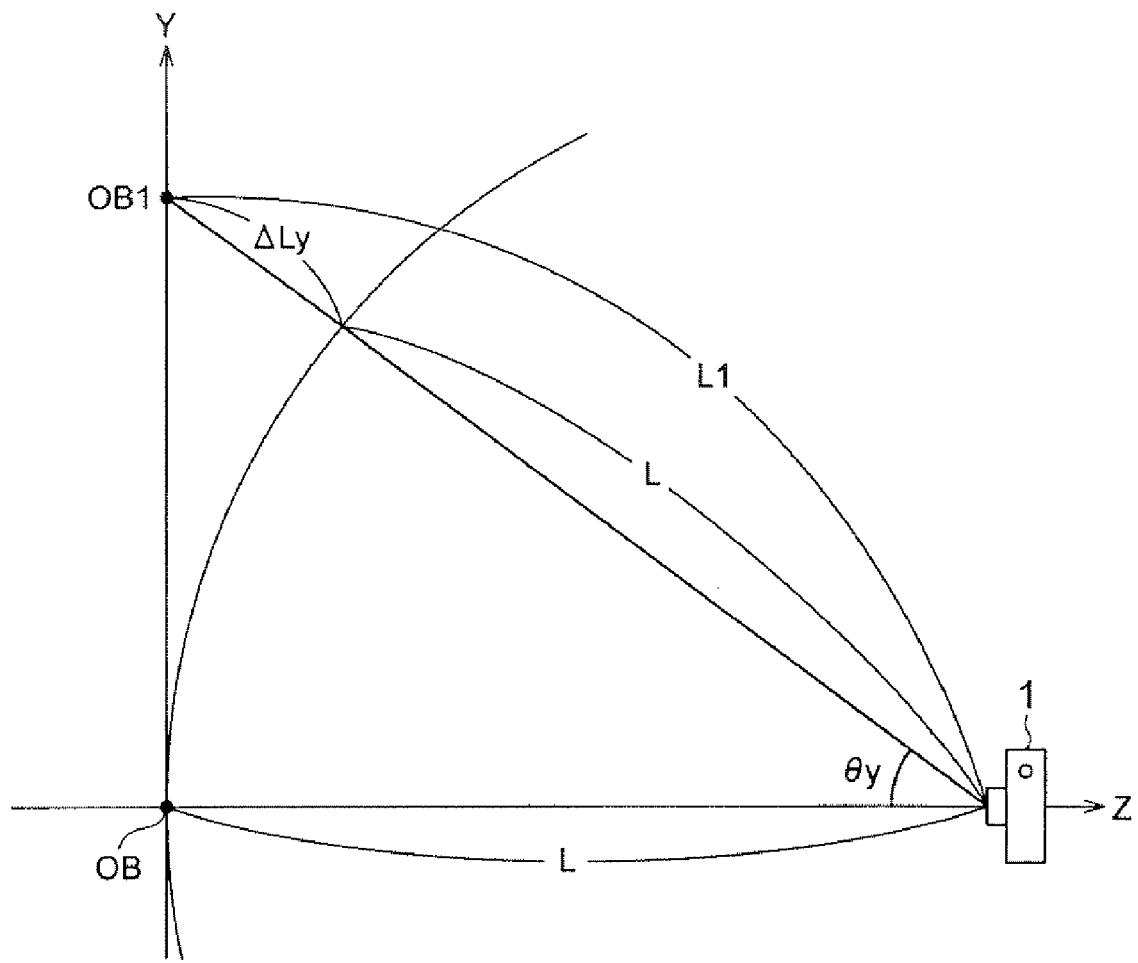
FIG. 9 is an explanatory diagram illustrating the auto focus correcting process in a Y axis direction.
Figure 10:
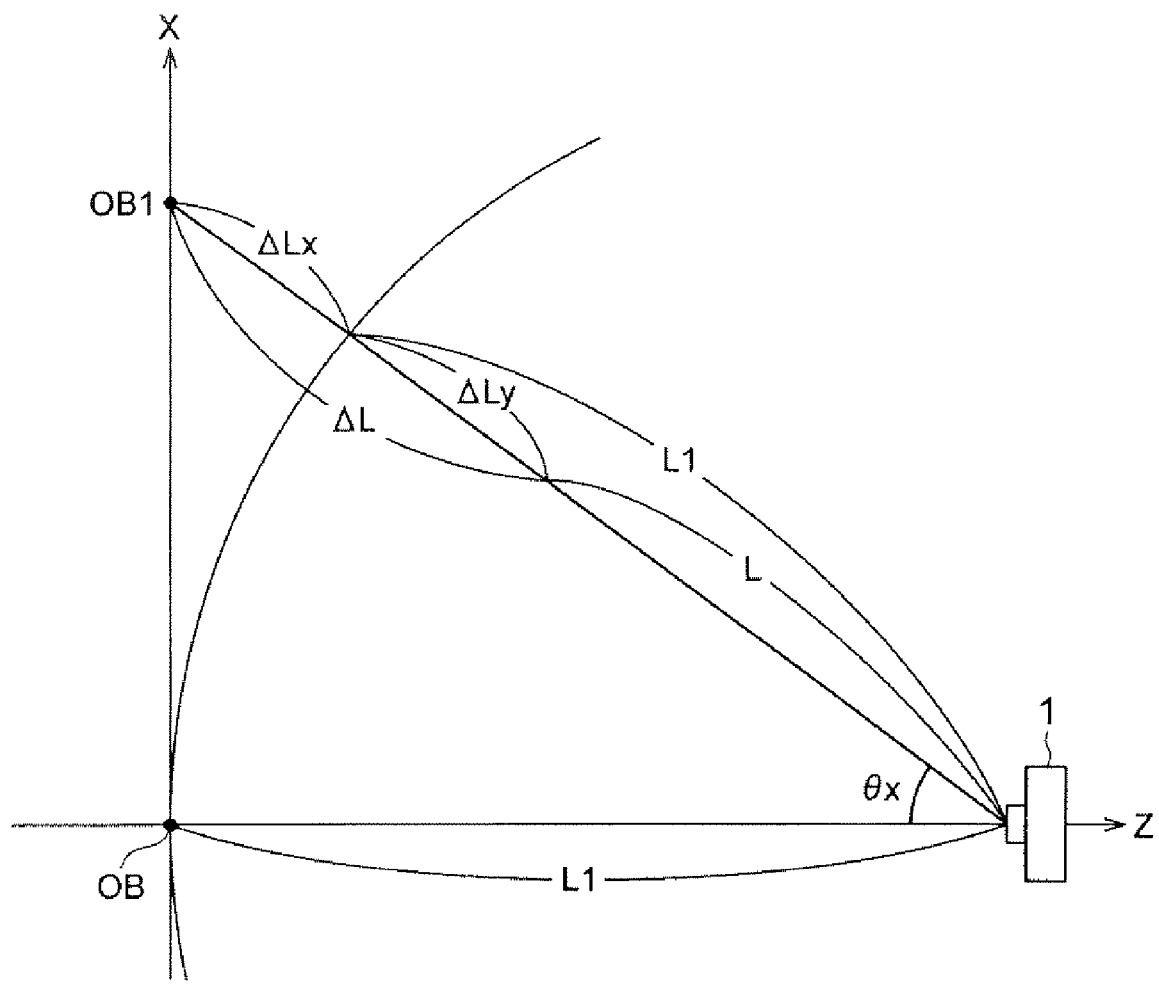
FIG. 10 is an explanatory diagram illustrating the auto focus correcting process in an X axis direction.

FIG. 9 is a diagram illustrating the auto focus correcting operation in the X axis direction FIG. 10 is a diagram illustrating the auto focus correcting operation in the Y axis direction.

In the auto focus correcting operation, the CPU 11 calculates the amount of auto focus correction ΔL on the basis of the calculated X-axis amount of shake θx and Y-axis amount of shake θy. Specifically, first, as shown in FIG. 9, the CPU 11 calculates the amount of auto focus correction in the Y axis direction ΔLy from the following expression on the basis of the Y-axis amount of shake θy:

$$\Delta Ly = L - L/\cos\theta y.$$

As a result, the distance L1 from the appearing object OB1 in which only the Y-axis amount of shake is corrected is as follows:

$$L1 = L + \Delta Ly.$$

Subsequently, as shown in FIG. 10, the CPU 11 calculates the amount of auto focus correction in the X axis direction ΔLx from the following expression on the basis of the X-axis amount of shake θx and the distance L1 from the appearing object OB1:

$$\Delta Ly = L - L/\cos\theta y.$$

From this result, the CPU 11 calculates the amount of auto focus correction ΔL as follows:

$$\Delta L = \Delta Lx + \Delta Ly.$$

The CPU 11 controls the camera control circuit 21 to perform the auto focus correcting operation on the basis of the amount of auto focus correction ΔL and sets a position shifted by the amount of auto focus correction ΔL from the focused focal position acquired in step S13 as a new focused focal position.

In the above-mentioned auto focus correcting operation, since a configuration for correcting the focused focal position, acquired through the auto focus controlling operation in the state where the shutter switch is semi-shuttered, by the difference corresponding to the amount of shake is employed, it is possible to reduce the time for the auto focus correcting operation, thereby acquiring a more in-focus image.

The CPU 11 temporarily stores the image data in the photographing unit RAM 23 on the basis of the new focused focal position and writes the image data to the removable medium 50 under the control of the control unit 10.

As described above, according to the first embodiment, even when shake occurs in the image pickup device employing the contrast detecting method, it is possible to obtain a contrast value considering the shake and to collect more accurate contrast information, thereby performing a more accurate auto focus controlling operation.

Second Embodiment

In the auto focus controlling operation according to the first embodiment, the selection and non-selection of a sampled contrast value is judged on the basis of the amount of shake in the optical axis direction of the lens at the time of sampling and the focused focal position is calculated on the basis of the contrast value judged as being selected among the sampled contrast values. However, in the auto focus controlling operation according to a second embodiment of the invention, a relative distance corresponding to the corresponding sampled contrast value is corrected on the basis of the amount of shake in the optical axis direction of the lens at the time of sampling and then the focused focal position is calculated on the basis of the corrected contrast value.

In the second embodiment, the configuration of the device and the basic flow of processes are similar to those described with reference to FIGS. 1 to 5 in the first embodiment and thus detailed description thereof will be omitted.

Figure 11:
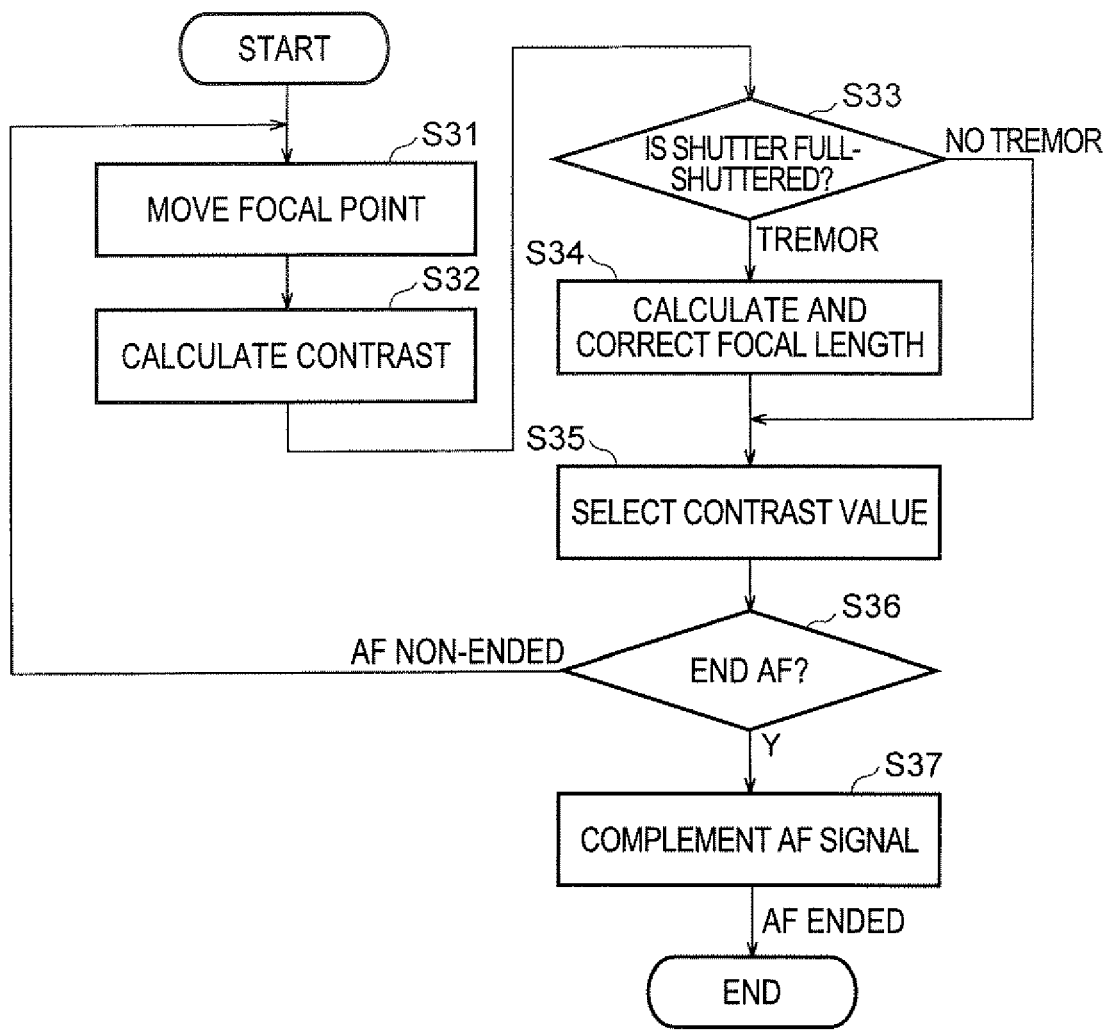
FIG. 11 is an explanatory diagram illustrating a case where an auto focus control process according to a second embodiment is performed using a contrast detecting method.

FIG. 11 is a flowchart illustrating a case where the auto focus controlling operation according to the second embodiment is performed using the contrast detecting method.

In the following description, it is assumed that the focused focal position when no shake occurs is the lens position P7.

First, at the time of detecting an auto focus, the CPU 11 controls the camera control circuit 21 to set the position of the lens constituting the photographing camera 22 to P0 (=initial focal position) (step S31).

At the position P0, the CPU 11 acquires contrast sampling data C0 by sampling the contrast values (step S32).

Subsequently, the CPU 11 judges whether shake occurs on the basis of the output of the angular velocity detecting unit 30 (step S33). Specifically, when the amount of shake is less than a predetermined reference amount of shake, it is judged that no shake occurs.

When it is judged in step S33 that no shake occurs, the CPU 11 selects an obtainable contrast value (step S35) and then performs the process of step S36.

When it is judged in step S33 that shake occurs, the CPU 11 corrects the relative distance (corresponding to the focal length) between the lens and the object (step S34).

Figure 12:
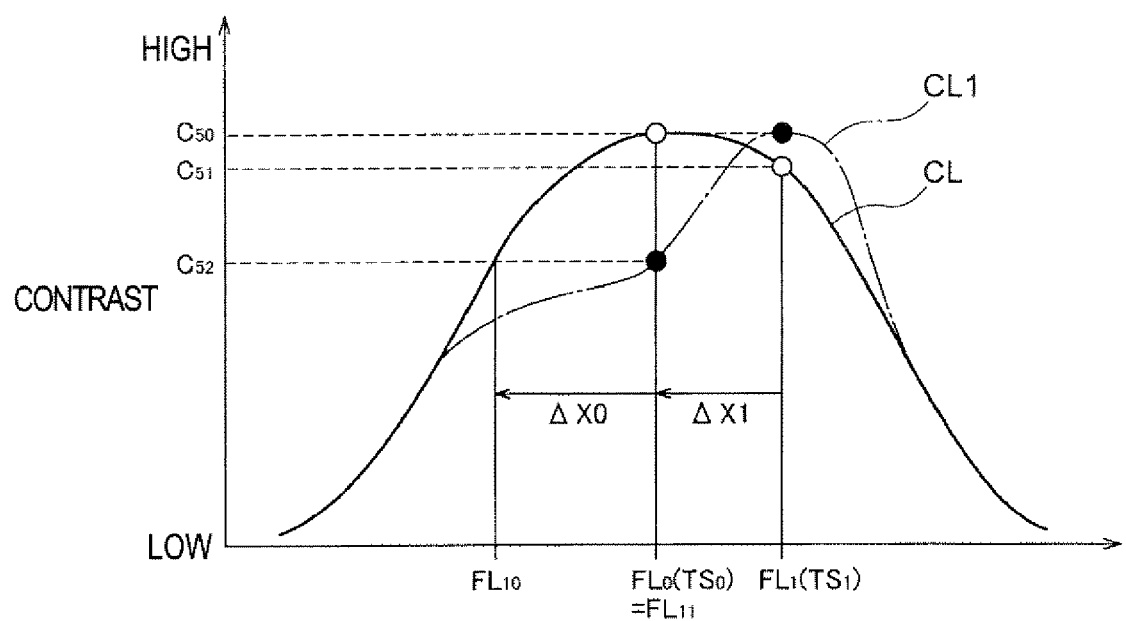
FIG. 12 is an explanatory diagram illustrating a process of correcting a relative distance between a lens corresponding to a contrast value and an object on the basis of on an amount of shake.

FIG. 12 is a diagram illustrating an operation of correcting the relative distance between the lens and the object corresponding to the contrast value on the basis of the amount of shake.

When no shake occurs and the relative distance between the lens and the object at the sampling time TS0 is FL=FL0, the obtainable contrast value is a contrast value C50.

On the contrary, when the amount of shake at the sampling time TS0 is ΔX0 in the direction closer to the object, the actual relative distance between the lens and the object is FL=FL10.

As a result, the obtainable contrast value is C52.

As described above, when the amount of shake at the sampling time TS1 is ΔX1 in the direction closer to the object, the actual relative distance between the lens and the object is FL=FL11=FL0.

As a result, the obtainable contrast value is C50.

Accordingly, when the focused focal position is obtained without correcting the shake, it is erroneously recognized that the position of the lens is the position corresponding to the relative distance FL=FL1 between the lens and the object is FL=FL=FL10.

Therefore, in this embodiment, when shake occurs, the CPU 11 corrects the relative distance FL between the lens and the object is FL=FL10 when no shake occurs on the basis of the amount of shake (in the above-mentioned example, ΔX0 and ΔX1), considers the acquired distance as the relative distance FL (in the above-mentioned example, FL10 and FL11) between the lens and the object, and selects the corrected relative distance as the contrast value (=contrast sampling data) at the corresponding position (step S35).

The CPU 11 judges whether the auto focus controlling operation is ended (step S36).

In this case, since the auto focus controlling operation is not ended yet, the CPU 11 controls the camera control circuit 21 to drive the lens constituting the photographing camera 22 in the direction of arrow A1 along the optical axis direction AX, sets the position of the lens to P1, and acquires the contrast sampling data C1.

In this way, the CPU 11 performs the processes of steps S31 to S35 and sequentially acquires the contrast sampling data.

Furthermore, the CPU 11 controls the camera control circuit 21 to perform the processes of steps S31 to S35 to drive the lens constituting the photographing camera 22 in the direction of arrow A2 along the optical axis direction AX. Then, the CPU 11 acquires the contrast sampling data C14 again with the position of the lens set to P14. Subsequently, the CPU 11 calculates a weighted average of the contrast sampling data C14 acquired at the time of driving the lens in the direction of arrow A1 and the contrast sampling data C14 acquired at the time of driving the lens in the direction of arrow A2 and sets the weighted average as new contrast sampling data C14 at the lens position P14. Thereafter, the CPU 11 acquires the contrast sampling data C13 to C0, complements the contrast sampling data values on the basis of the acquired contrast sampling data C0 to C14 to create a contrast curve CL (see FIG. 7) (step S37), and calculates the focused focal position on the basis of the created contrast curve. The CPU 11 sets the lens position P7 having the highest contrast value as the focused focal position.

When the contrast curve is obtained by complementing the contrast sampling data values on the basis of the obtained contrast sampling data without correcting the relative distance FL between the lens and the object, as indicated by a dot-chained line in FIG. 7, the lens position (corresponding to the distance FL1) having the highest contrast value is considerably deviated from the actual focused focal position (corresponding to the distance FL0), whereby an image out of focus is taken.

Subsequently, the CPU 11 judges whether the shutter switch is full-shuttered (step S14).

When it is judged in step S14 that the shutter switch is not full-shuttered yet (step S14: NO), the CPU 11 is in the standby state.

When it is judged in step S14 that the shutter switch is full-shuttered (step S14: YES), the CPU 11 the integrated angular velocity for the predetermined sampling period on the basis of the output signals of the angular velocity detecting unit 30 (step S15).

The calculation of the integrated angular velocity in the control unit 10 will be described in brief. The CPU 11 of the control unit 10 calculates the angular velocity (rad/sec) on the basis of the angular velocity detection signal and calculates the integrated angular velocity Σ(rad/sec) by integrating the angular velocity (rad/sec) with a predetermined sampling interval (sec). In practice, the control unit 10 calculates the X-axis integrated angular velocity Σx and the Y-axis integrated angular velocity Σy as the integrated angular velocity.

Subsequently, the CPU 11 judges whether a panning operation of the digital still camera is performed on the basis of the X-axis integrated angular velocity Σx and the Y-axis integrated angular velocity Σy (step S16). Here, the panning operation means an operation of semi-shuttering the shutter switch in a state where a person is disposed at the center of a screen, performing the auto focus lock to the person, and then changing the orientation of the digital still camera and correcting the composition so that a person is disposed at side portion of the screen.

When it is judged in step S16 that the panning operation is performed in the digital still camera (step S16: YES), the CPU 11 needs hold the auto focus locked state without considering the shake. Accordingly, the CPU performs the photographing operation at once (step S19). That is, the CPU 11 fixes the lens to the focused focal position where the auto focus locked state is set by the auto focus controlling operation of step S13 and then taking a photograph of an object with the photographing camera 22. The CPU 11 temporarily stores the acquired image data in the photographing unit RAM 23 and writes the image data to the removable medium 50 under the control of the control unit 10.

At the same time of writing the image data in the removable medium 50, the taken image is displayed on the display panel 24.

When it is judged in step S16 that the digital still camera does not perform the panning operation (step S16: NO), the CPU 11 of the control unit 10 calculates an X-axis amount of shake θx (mm) and an Y-axis amount of shake θy (mm) on the basis of the calculated X-axis integrated angular velocity Σx and Y-axis integrated angular velocity Σy. Subsequently, the CPU 11 judges whether at least one of the X-axis amount of shake θx and the Y-axis amount of shake θy is greater than an allowable value (step S17). In this case, the allowable value is properly set on the basis of the photographing condition such as a zoom magnification and a shutter speed.

When it is judged in step S17 that at least one of the X-axis amount of shake θx and the Y-axis amount of shake θy is greater than the allowable value (step S17: YES), the CPU 11 performs an auto focus correcting operation (step S18). The auto focus correction operation is similar to that of the first embodiment and thus detailed description thereof is omitted.

As described above, according to the second embodiment, even when shake occurs in the image pickup device employing the contrast detecting method, it is possible to obtain an accurate contrast value, by correcting the relative distance between the lens and the object in consideration of the shake, thereby performing a more accurate auto focus controlling operation.

MODIFIED EXAMPLE

Although the digital still camera has been described in the above-mentioned embodiments, the invention can be applied to other electro-optic apparatuses such as a camera built in a mobile phone, a camera combined with a PDA, and a single-lens reflex camera which can photograph a still image.

Although the configuration for detecting the amount of shake on the basis of the angular velocity has been exemplified in the above-mentioned embodiments, the invention is not limited to it, but may have a configuration for detecting the amount of shake by the use of an acceleration sensor.

The entire disclosure of Japanese Patent Application Nos: 2005-339715, filed Nov. 25, 2005, 2005-339716, filed Nov. 25, 2005, 2006-282302, filed Oct. 17, 2006, 2005-375280, filed Dec. 27, 2005, are expressly incorporated by reference herein.

What is claimed is:

1. An image pickup device comprising:
an auto focus control unit sampling contrast values of an image of an object while driving a lens in an optical axis direction, calculating a focused focal position based on the contrast values, and driving the lens to the focused focal position;
a shake detecting unit detecting an amount of shake in the optical axis direction; and
a selection judging unit selecting ones of the sampled contrast values based on the amount of shake detected at the time of sampling,
wherein the auto focus control unit calculates the focused focal position based on the selected ones of the sampled contrast values,
wherein the selection judging unit:
selects one of the sampled contrast values when the amount of shake detected at the time of sampling the one of the sampled contrast values is less than or equal to a first reference amount of shake,
discards the one of the sampled contrast values when the amount of shake detected at the time of sampling the one of the sampled contrast values is greater than or equal to a second reference amount of shake that is larger than the first reference amount of shake, and
selects the one of the sampled contrast values when the amount of shake detected at the time of sampling the one of the sampled contrast values is greater than the first reference amount of shake and less than the second reference amount of shake, and assigns the one of the sampled contrast values to a selected one of:
a lens position at the time of sampling the one of the sampled contrast values,
a lens position at the time of sampling a sample contrast value immediately prior to the one of the sampled contrast values, and
a lens position at the time of sampling a sample contrast value immediately subsequent to the one of the sampled contrast values,
wherein the selection judging unit generates a corrected lens position by correcting the lens position at the time of sampling the one of the sampled contrast values based on the amount of shake, and selects the selected one of the lens positions to minimize a difference between the selected one of the lens positions and the corrected lens position.

2. The image pickup device according to claim 1, wherein the shake detecting unit includes gyro sensors and detects the amount of shake on the basis of an angular velocity detection signal output from the corresponding gyro sensor.

3. The image pickup device according to claim 1, wherein the auto focus control unit includes an auto focus correcting unit performing a correction control so as to correct the focused focal position on the basis of the amount of shake in the optical axis direction of the lens and to drive the lens to the corrected focused focal position.

4. The image pickup device according to claim 3, wherein the auto focus control unit deviates a relative position of the lens to an image pickup element by the amount of shake by means of the correction control.

5. The image pickup device according to claim 3, further comprising a shutter switch operating a shutter,
  wherein the auto focus control unit drives the lens to the focused focal position and holds the lens at the corresponding position at the time of semi-shuttering the shutter switch, and
  wherein the auto focus correcting unit performs the correction control at the time of full-shuttering the shutter switch.

* * * * *